United States Patent [19]

Webb et al.

[11] Patent Number: 4,664,513
[45] Date of Patent: May 12, 1987

[54] MULTIDIMENSIONAL VORTICITY MEASUREMENT OPTICAL PROBE SYSTEM

[75] Inventors: Watt W. Webb; Daniel Ferguson, both of Ithaca, N.Y.

[73] Assignee: Cornell Research Foundation, Inc., Ithaca, N.Y.

[21] Appl. No.: 654,431

[22] Filed: Sep. 25, 1984

[51] Int. Cl.$^4$ .............................................. G01P 3/36
[52] U.S. Cl. ................................. 356/28; 73/861.05; 356/338; 356/342; 356/343
[58] Field of Search ................. 356/28, 338, 342, 343; 73/861.05

[56] References Cited

U.S. PATENT DOCUMENTS 4,272,189  6/1981  Bailey et al. ........................... 356/28
4,385,830  5/1983  Webb et al. ........................... 356/28
4,470,696  9/1984  Ballard ................................... 356/28

Primary Examiner—Stephen C. Buczinski
Attorney, Agent, or Firm—Jones, Tuller & Cooper

[57] ABSTRACT

Improved detector and processing circuitry for use with a vorticity measurement optical probe system is disclosed. The invention makes use of a dual axis position indicating photodetector so that two components of vorticity may be simultaneously measured. Reflective spherical particles are disposed in a fluid whose vorticity is to be measured, and a light beam is reflected off of the particles and onto the photodetector. Analog and digital processing circuitry is connected to the outputs of the photodetector, and generate data that is indicative of the position of the reflected light beam on the photodetector as a function of time. Computer interface circuitry is also provided which enables the beam position data to be read into a digital computer so that the two vorticity components may be calculated therefrom. Embodiments which utilize plural axis photodetectors are also disclosed.

15 Claims, 11 Drawing Figures

FIG. IA
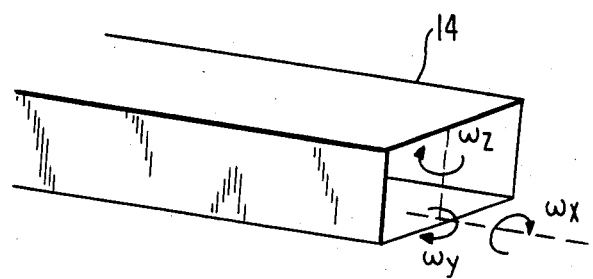
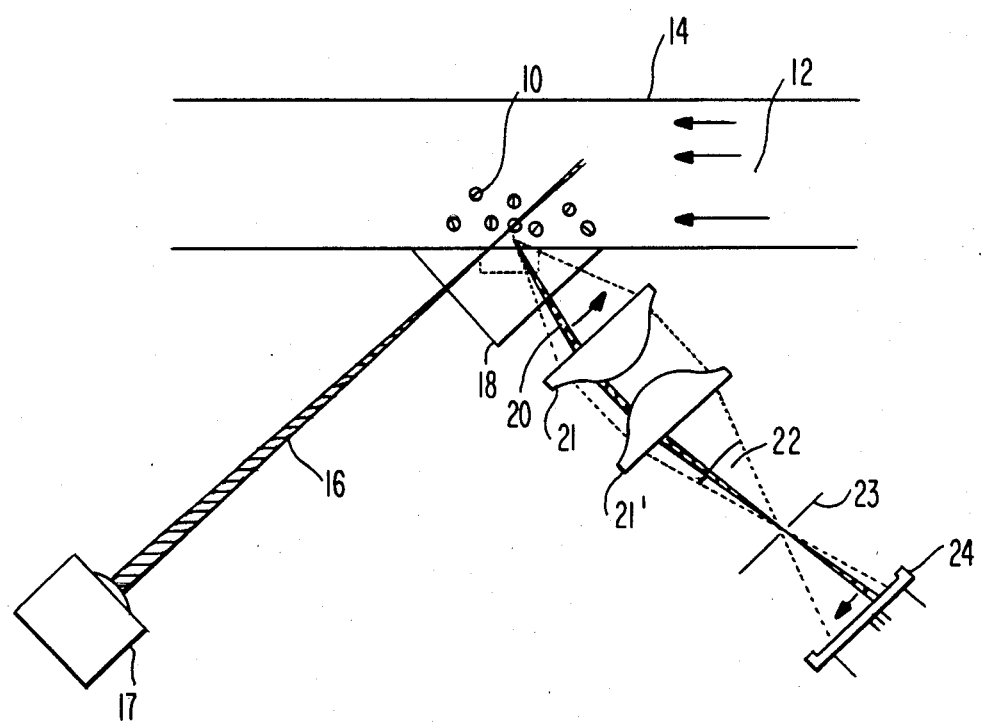
FIG. I

MULTIDIMENSIONAL VORTICITY MEASUREMENT OPTICAL PROBE SYSTEM

The present invention arose out of work done under Department of Defense, Office of Naval Research Contract No. N00014-83-K-0460. Accordingly, the government may have rights under this invention.

BACKGROUND

The present invention relates to improved detector and processing circuitry for use with a vorticity measurement optical probe system, such as the system set forth in U.S. Pat. No. 4,385,830, to Webb et al., which is hereby incorporated herein by reference.

In the vorticity measurement system set forth in Webb et al., a plurality of small spherical particles are disposed in the fluid whose vorticity ($\bar{\omega}$) is to be determined. It has been shown that the spherical particles when suspended in a flowing fluid accurately track the local vorticity $\omega$ of that fluid by rotation with angular velocity $\bar{\Omega} = \bar{\omega}/2$. To be able to observe the rotation, individual optically flat crystalline mirrors are trapped in each particle. The particles are dispersed in a fluid which has substantially the same refractive index as the particles, and the fluid and the particles are illuminated by a light beam. The rotation rates of the reflections from the mirrors are determined by measuring the time delay between signals from a closely spaced pair of detectors. These measurements are accumulated in a data processor such as a microprocessor, and the vorticity spectra and correlations of interest are analyzed on-line by the processor. Various higher correlations are accessible by subsequent calculations and multiple measurement locations along or around a flow channel. Each reflection beam thus provides an accurate measurement of vorticity components.

Although the system set forth in U.S. Pat. No. 4,385,830 works well for flows with large vorticity/-velocity ratios such as occur at boundary layers, it has several limitations. These include band width and dynamic range restrictions, limitation to a single vorticity component, (the spanwise component, $\omega_z$, in the boundary layer), and only one sign of that component. Specifically, in the measurement system set forth in Webb et al., the vorticity of the fluid is determined by measuring the time interval between when the light beam reflected off of the mirror of a rotating sphere strikes a first detector, and when the light beam strikes a second detector. An inherent requirement of the Webb system is that the spheres must be rotating at least at some minimum velocity in order for the reflected beam to move from the first detector to the second detector within the time in which the sphere is in the incident beam's path. Consequently, very low vorticities, as well as zero vorticity can not be measured by the Webb system. Also, the detector circuitry of the Webb system requires that the light beam must strike the first detector, then the second detector in sequence for the time interval to be measured. The system cannot operate in the reverse manner, i.e., light beam striking second detector, then first detector, and for this reason positive and negative signed components of vorticity cannot be measured by the Webb system. Finally, the optical elements of Webb enable only a single component of vorticity, $\omega_z$, to be measured inasmuch as the detector elements are not two or three dimensional.

SUMMARY OF THE INVENTION

It is accordingly an object of the present invention to provide improved detector and processing circuitry for a vorticity optical probe measurement system which allows for measurement over a large range of vorticity values, including very low and zero vorticity, allows for measurement of both positive and negative vorticity components, and allows for simultaneous measurement of more than one vorticity component.

It is a further object of the present invention to provide detector and processing circuitry for a vorticity optical probe measurement system which is versatile enough to allow for easy interconnection of more than one detector element so that multiple simultaneous measurements may be made for increasing the temporal resolution of the system, and for enabling spatial correlation and autocorrelation calculations to be performed.

These and other objects of the invention are obtained through the use of a position sensing dual axis photodetector such as the Model P1N-SC25 sold by United Detector Technology (UDT) and associated preamplifier circuitry, in the place of the detector elements set forth in Webb. The UDT detector and associated preamplifier circuitry provides three outputs; one which is proportional to the intensity of the light incident on the detector, one which is proportional to the product of this intensity and the position of the incident light beam with respect to the X axis of the detector, and one which is proportional to the product of the intensity and the position of the incident light beam with respect to the Y axis of the detector.

All three of these outputs are passed through noise elimination circuitry and analog divider circuitry so that two analog outputs are obtained; one which is proportional to the position of the incident light beam with respect to the X axis of the detector, and the other which is proportional to the position of the light beam with respect to the Y axis of the detector. Threshold circuitry is also provided which prevents the output of a value other than zero when no light beam is incident on the detector.

The analog signals representative of the X and Y positions of the light beam are then passed through a pair of analog to digital (A to D) converters, which digitize the signals for subsequent storage in the memory of a conventional computer. Each of the position signals is digitized into an 8 bit word so that the two signals may be combined into a single 16 bit word in the computer memory.

Since the vorticity rate in different locations within a fluid flow may vary greatly, the rate at which the beam position data is sampled by the A to D converters should be variable. This is easily accomplished through the use of a variable rate master clock. In the system disclosed herein, it has been experimentally shown that a sampling rate as high as 1 sample every 5 μs may be obtained. To interface the outputs of the A to D converters with the memory of the computer, conventional Direct Memory Accessing (DMA) techniques are utilized. In this manner, the computer's DMA controller need not constantly wait for data to appear at the outputs of the A to D converters. Instead, when a light beam is incident on the detector, and valid data appears at the converter outputs, the circuitry of the present invention sends a signal to the DMA controller so that it may start reading the data into memory. Similarly, when the light beam is no longer incident on the detector, another signal is sent to the DMA controller to indicate that no more data is available so that the controller will stop reading in data from the A to D converters, and will, as is conventional, instruct the computer to do the necessary housekeeping chores on the block of data received from this particular excursion of the light beam across the detector.

Once the beam position data is stored in memory, the two vorticity components, $\omega_x$ about the axis parallel to the flow stream and $\omega_z$ about the vertical axis, may be calculated therefrom. Since the sampling rate is known, the light beam's speed and direction across the face of the detector may be determined. From this, the angular velocity of the spheres, and thereby the vorticity of the fluid in which the spheres are disposed, may be determined.

Since the above detector system does not utilize a two point measurement system as does the system set forth in Webb, there is no lower limit placed on the value of vorticity which may be measured by the system, nor is there any limitation as to the sign of the vorticity component which is measured. In addition, since the detector is two dimensional, two components of vorticity may be determined from the beam position data, rather than only a single component as in Webb.

The versatility of the detector and processing circuitry set forth herein enables the system to be easily expanded to include plural detectors. In one plural detector embodiment of the invention, two incident light beams of different wavelengths (e.g. laser beams from the 488 nm and 514.5 nm lines of an argon ion laser) and from different positions are directed at the fluid flow. The reflections from these beams are directed through optics which include a pellicle beam splitter, and a pair of interference filters so that the first detector receives only reflections from the first light beam, and the second detector receives only reflections from the second light beam. Such an arrangement enables the doubling of the data rate, elimination of dead times between events and excess noise at the high frequency limit, and, with suitable orientation of the incident beams and the collection optics, the measurement of all three components of vorticity ($\omega_x$, $\omega_y$, and $\omega_z$).

Finally, in a second two detector embodiment of the invention, a single incident light beam is utilized; however, the collection optics and beam splitter are arranged in a manner so that the first detector receives reflections from a first location in the fluid flow, and the second detector receives reflections from a second separate location in the fluid flow. Such an arrangement is useful for the determination of spatial correlation functions.

BRIEF DESCRIPTION OF THE DRAWINGS

The foregoing and additional objects, features and advantages of the present invention will become apparent from a consideration of the following detailed description thereof, taken in conjunction with the accompanying drawings, in which:

FIG. 1 is a diagrammatic top planview of the optical system used to detect the rotation of particles in one of the embodiments of the invention;

FIG. 1a is an illustration of the relative orientation of the vorticity components $\omega_x$, $\omega_y$, and $\omega_z$ with respect to a flow channel;

DESCRIPTION OF PREFERRED EMBODIMENTS

Figure 2:
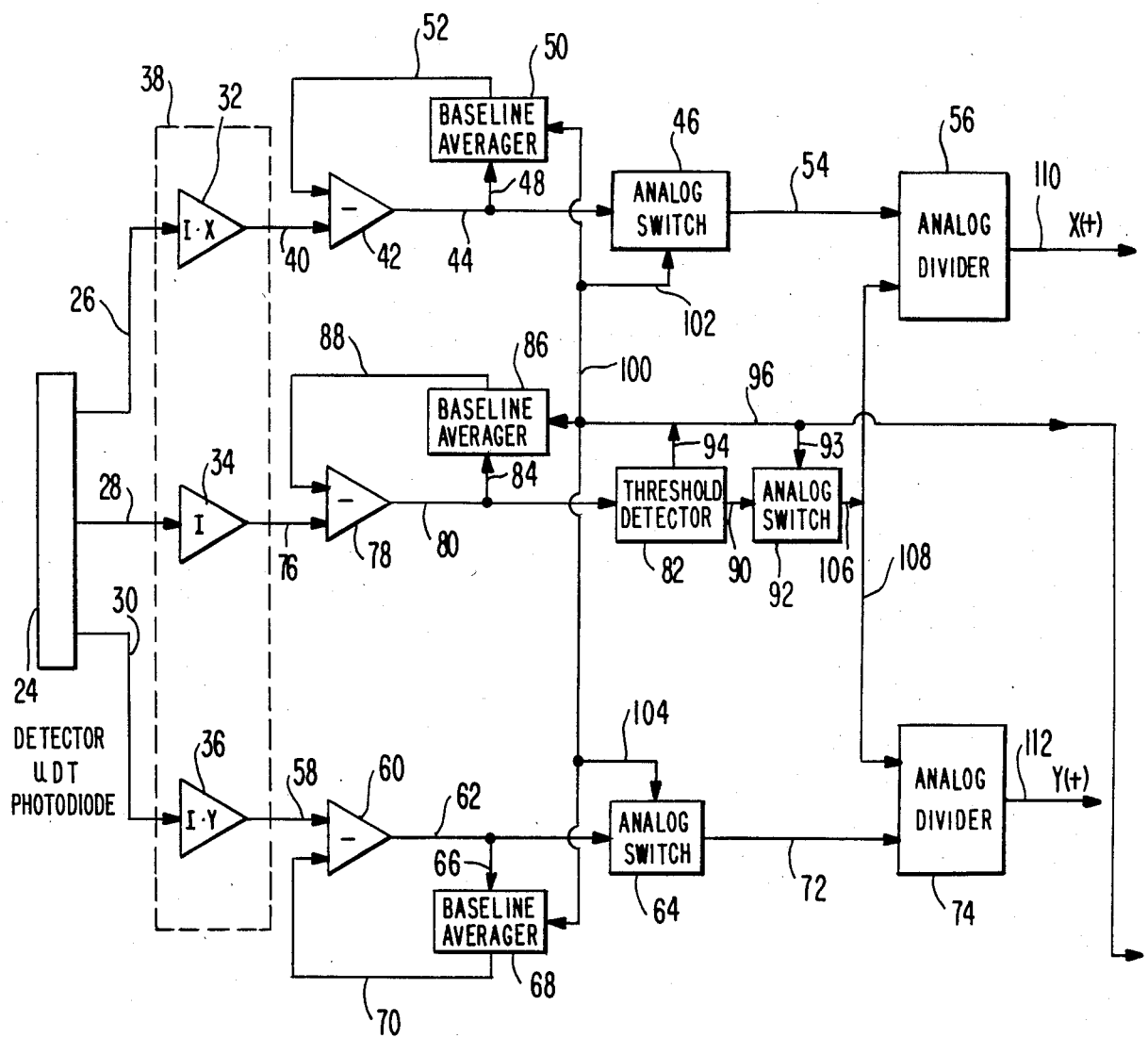
FIG. 2 is a block diagram of the beam position analog processing circuitry for use with a single 2 dimensional photodetector.

Turning now to a more detailed consideration of a first embodiment of the present invention, there is illustrated in FIG. 1, an optical system for detecting the rotation of probe particles in a fluid flow, wherein reflective spheres 10 of the type disclosed in U.S. Pat. No. 4,385,830 to Webb et al., are illustrated (grossly enlarged for clarity) as being suspended in a fluid flow 12, the flow being contained in a flow channel 14. A focused incident light beam 16 which is produced by a light source 17, such as a laser, is focused and directed toward the fluid flow 12 through a prism 18. A reflected beam 20 generated by the spherical particles 10 from the incident beam, passes through a pair of aspheric collectors 21 and 21' which are of a small f-number (f≈1.0) so that the mirror reflections from the sampled volume are sharply imaged over a large reflection solid angle 22 with minimal spherical aberration. This large solid angle 22 improves precision and decreases the required particle concentration for a given data rate. From the collectors 21 and 21' the reflected beam 20 passes through a pinhole 23, and impinges on a dual axis position-sensing photodetector 24.

The optical system set forth in FIG. 1 is arranged so that two of the three components of vorticity may be measured. FIG. 1a illustrates the orientation of these three components, $\omega_x$, $\omega_y$, and $\omega_z$, relative to the flow channel 14. The system of FIG. 1 is arranged so that the streamwise component $\omega_x$, which is about an axis parallel to the flow stream 12, and the spanwise component $\omega_z$, which is about an axis perpendicular to the top of flow channel 14, may be measured.

In the operation of the system set forth in FIG. 1, the rotation of the reflective spherical particles 10 caused by turbulent flow of the fluid 12 in turn causes the beam 20 reflected from any given reflective surface to scan across the face of detector 24. The direction and speed of the beam as it scans across the detector is dependent on two components of angular velocity of the particles, $\Omega_x$ and $\Omega_z$. From these components, the vorticity components $\omega_x$ and $\omega_z$ may be easily determined since $\Omega = \omega/2$. The processing circuitry set forth in FIGS. 2 and 3 is utilized to determine the direction and speed of the beam as it scans across detector 24 so that these vorticity components, $\omega_x$ and $\omega_z$, may be calculated, as by means of a digital computer.

Figure 3:
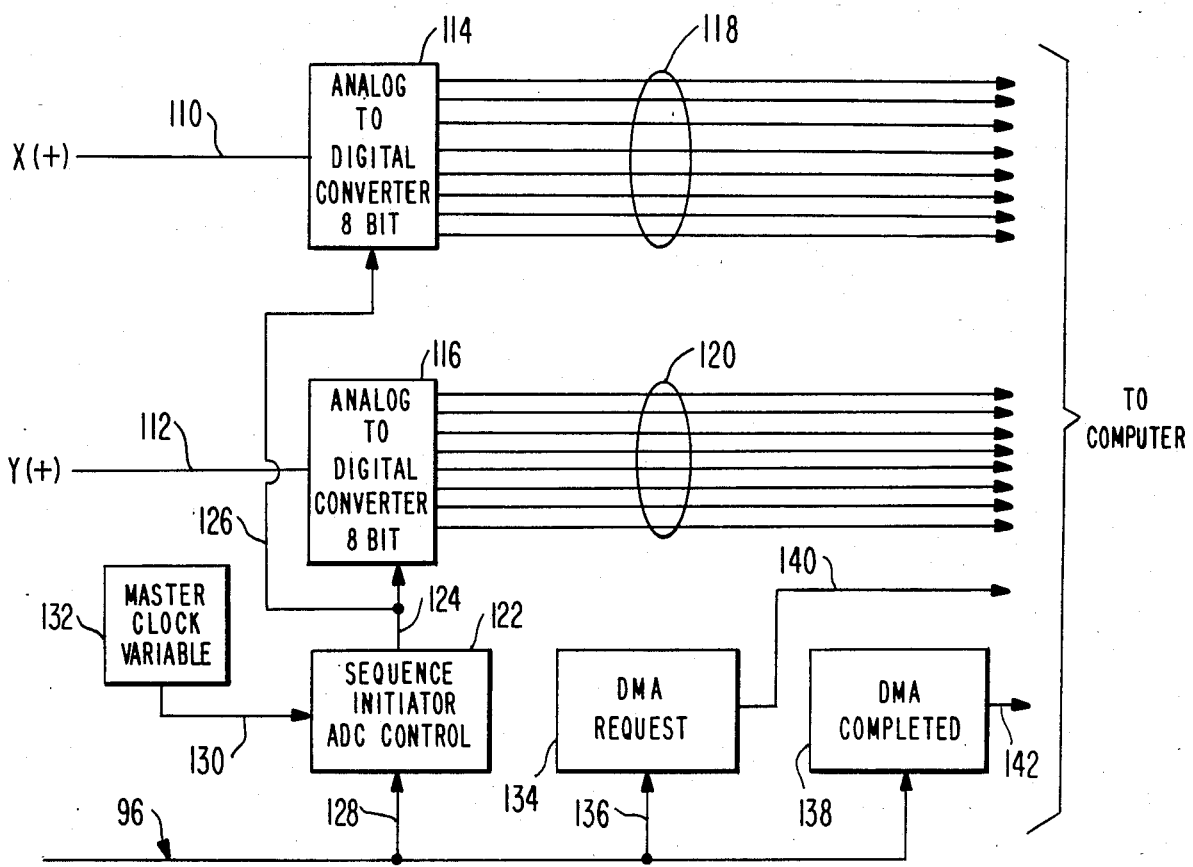
FIG. 3 is a block diagram of the digital processing circuitry utilized for converting the analog outputs of the circuitry of FIG. 2 to digital form, and interfacing the same to the memory of a digital computer.

Turning now to FIG. 2, there is shown a block diagram of a single detector of the present invention, and a portion of its associated processing circuitry. As illustrated, a dual axis photodetector 24 has its outputs 26, 28 and 30, connected to preamplifiers 32, 34 and 36, respectively, of pre-amp 38. The output of preamplifier 32 is an analog signal which is proportional to the product of the x position at which the centroid of light impinging on the detector is located, and the intensity of the light impinging on the detector; the output of preamplifier 34 is an analog signal which is proportional to the intensity of the light impinging on the detector, and the output of preamplifier 36 is an analog signal which is proportional to the product of the Y position at which the centroid of light impinging on the detector is located and the intensity of the light impinging on the detector.

The output of preamplifier 32 is connected through a line 40 to one of the inputs of a differential amplifier 42, which acts as a subtraction circuit. Connected to the output of amplifier 42, is a line 44 which feeds the signal directly to the input of an analog switch 46, and further, through a line 48, to the input of a baseline averager circuit 50. The output of averager circuit 50 is connected through a line 52 to a second input of differential amplifier 42 and thus forms a feedback loop therewith. The output of analog switch 46 is fed through a line 54 to the numerator input of an analog divider 56. Since differential amplifier 42 acts as a subtraction circuit, its analog output on line 44 is equivalent to the output from preamplifier 32 minus the output from baseline averager circuit 50. The purpose of the feedback loop between averager circuit 50 and amplifier 42 is to provide automatic compensation for background or noise signals which may be generated by preamplifier 32.

The output of preamplifier 36 is fed through circuitry which is identical to the circuitry connected to the output of preamplifier 32. Specifically, a line 58 connects the output of preamplifier 36 to one of the inputs of a differential amplifier 60, which, like differential amplifier 42, acts as a subtraction circuit. A line 62 feeds the output of amplifier 60 directly to the input of an analog switch 64, and through a line 66 to the input of a baseline averager circuit 68. The output of averager circuit 68 is fed through a line 70 to a second input of amplifier 60, while the output of switch 64 is connected through a line 72, to the numerator input of an analog divider 74.

Preamplifier 34 has its output connected through a line 76 to one of the inputs of a differential amplifier 78, which, like amplifiers 42 and 60, acts as a subtraction circuit. The output of amplifier 78 is fed through a line 80 directly to the input of a threshold detector circuit 82, and through a line 84 to the input of a third baseline averager circuit 86. A line 88 connects the output of averager circuit 86 to a second input of differential amplifier 78 which, as in the output circuitry of preamplifier 32 and 34, forms a feedback loop for the elimination of unwanted background and noise signals. A line 90 feeds the output of threshold detector 82, which is the same signal that appears on input line 80, to an analog switch 92.

Threshold detector 82 senses when the input signal on line 80 exceeds a predetermined level. When the input signal is below this level, a logic level "0" is outputted from the threshold detector through a pair of lines 94 and 96 to baseline averager circuits 86; through lines 94, 96, and a line 98 to analog switch 92; through lines 94, 96, and a line 100 to baseline averager circuits 50 and 68; through lines 94, 96, 100 and a line 102 to analog switch 46; and, through lines 94, 96, 100, and a line 104 to analog switch 64. A logic level "0" causes the baseline averager circuits to constantly monitor their inputs, and adjust their outputs so that the outputs from differential amplifiers 42, 60, and 78 will be maintained at or near a zero level. In addition, a logic level "0" from threshold detector 82 causes analog switches 46 and 64 to feed a ground or zero level signal to analog dividers 56 and 74, respectively. When analog switch 92 receives a logic level "0" signal from the threshold detector 82, however, a high level signal is outputted through a pair of lines 106 and 108 to the denominator inputs of analog dividers 56 and 74. Consequently, a zero level output is provided by the divider 56 over its output line 110, and by the divider 74 over its output line 112.

When the signal passing from line 80 through threshold detector 82 to line 90 exceeds the predetermined threshold, a logic level "1" will be outputted from the detector over lines 94, 96, 100, 102, and 104. When this occurs, baseline averager circuits 50, 68, and 86 are put into a latching mode whereby their outputs are fixed at the levels which they were at just before the logic level "1" signal was outputted by the threshold detector 82. In addition, a logic level "1" output from the threshold detector 82 causes analog switches 46, 64, and 92 to pass their input signals from lines 44, 62, and 90, unaltered to their outputs over lines 54, 72, and 106, respectively.

In the operation of the circuitry set forth in FIG. 2, when no light beam impinges on detector 24, and only background radiation is sensed thereby, the intensity signal passing to threshold detector 82 will be insufficient to trigger the same, and a logic level "0" will be outputted over lines 94, 96, 98, 100, 102, and 104. This will cause the baseline averager circuits 50, 68, and 86 to monitor their inputs and adjust their outputs, which are connected to the respective inputs of the differential amplifiers 42, 60, and 78, so that the outputs from the amplifiers supplied to lines 44, 62, and 80 will tend to approach a zero or ground level, and other unwanted signals which are outputted from preamplifiers 32, 34, and 36, will be effectively eliminated.

A logic level "0" from the threshold detector 82 will also cause the analog switches 46 and 64 to pass a low level or ground signal over lines 54 and 72 to the numerator inputs of analog dividers 56 and 74, respectively. In addition, analog switch 92 will cause a high level signal to be passed through lines 106 and 108 to the denominator inputs of analog dividers 56 and 74. The reason for the high level signal from analog switch 92 is to prevent the dividers from attempting to divide by "0", which would cause them to go into saturation. Since ground signals are fed to the numerator inputs of the dividers when no light beam is incident on detector 24, a zero level output is provided from the dividers over lines 110 and 112, which represent the X position of the light beam as a function of time and the Y position of the light beam as a function of time, respectively.

When a beam of light is incident on detector 24, the intensity signal being fed from preamplifier 34 through differential amplifier 78 to the threshold detector 82 will exceed the detector's predetermined threshold, and a logic level "1" will be outputted by the detector over lines 94, 96, 98, 100, 102, and 104. This will cause baseline averager circuits 50, 68, and 86 to latch their outputs to the level at which they were just before the light beam impinged on detector 24. As a result, only that portion of the input signals over lines 40, 58, 76 to differential amplifiers 42, 60, and 78 corresponding to the unwanted background or noise signals will be fed back to, and thereby subtracted by, the differential amplifiers. Consequently, when a logic "1" is outputted by threshold detector 82, noise free information signals will be passed from differential amplifiers 42, 60, and 78, through analog switches 46, 64, and 92, respectively, to analog dividers 56 and 74.

Since the signal over line 54 to the numerator input of analog divider 56 is proportional to the product of (a) the intensity of the light falling on detector 24, and (b) the X position of the beam on the detector as a function of time, and since the signal over line 108 to the denominator input is proportional to the intensity of the light falling on detector 24, the output from divider 56 over line 110 is an analog signal which is proportional to the position of the beam along the X axis of detector 24 with respect to time. In a similar manner, the output from analog divider 74 over a line 112 is an analog signal which is proportional to the position of the beam with respect to the Y axis of the detector as a function of time. The signals from dividers 56 and 74 are fed over lines 110 and 112, along with the logic signal from threshold detector 82 over line 96, to further processing circuitry as shown in FIG. 3.

With reference now to FIG. 3, there is shown a block diagram of processing circuitry for digitizing the signals generated by analog dividers 56 and 74, for subsequent storage and processing by a digital computer. The analog signal from divider 56 is fed over line 110 to an 8 bit analog to digital (A to D) converter 114, and similarly, the analog signal from divider 74 is fed over line 112 to an 8 bit A to D converter 116. Output lines 118 and 120 from A to D converters 114 and 116, respectively, each feed 8 bits of data representing the X and Y axis coordinates corresponding to the position of the light beam on detector 24 from the A to D converters to the memory of a suitable computer such as an LSI 11/23 (not shown), where the data is stored as single 16 bit words.

In order to control the operation of A to D converters 114 and 116, a sequence initiator and A to D controller 122 is provided which is connected to the converters via lines 124 and 126. The sequence controller 122 is controlled by way of two inputs; one through line 96 and a line 128 from the logic output of the threshold detector 82, and the other through a line 130 from a variable master clock 132. The clock rate of clock 132 may be adjusted to vary the sampling rate of the A to D converters. It has been determined experimentally that a maximum sample rate of one conversion every 5 $\mu$s may be obtained.

A direct memory access (DMA) request circuit 134 is also connected to the logic output of threshold detector 82 (FIG. 2) through line 96 and a line 136. In addition, line 96 is also connected to a DMA completion indication circuit 138. The DMA request circuit 134 and DMA completion circuits 138 are connected to the DMA controller of the computer (not shown) via lines 140 and 142, respectively.

In the operation of the circuitry set forth in FIG. 3, when a light beam is incident on detector 24, valid beam position data is available at the outputs of analog dividers 56 and 74 on lines 110 and 112, and a logic "1" appears on line 96 from the logic output of threshold detector 82. This logic "1" signal on line 96 in turn causes the sequence controller 122 to gate clock pulses from master clock 132, through lines 130, 124, and 126, to the A to D converters 114 and 116. At the same time, a logic "1" on line 96 also causes the DMA request circuit 134 to send a request signal over line 140 to the computer's DMA controller to indicate that data is ready to be read from the A to D converters over lines 118 and 120 into the computer's memory. The DMA controller thereafter continually samples the outputs of the A to D converters at the predetermined sampling rate, and stores one 16 bit word in the computer's memory for each sample, this 16 bit word representing the X and Y coordinates of the light beam on the detector at the time of the sample.

Once a light beam is no longer incident on detector 24, and only background radiation is sensed thereby, the logic output of threshold detector 82 will go to "0", which will appear on line 96 to cause the sequence controller 122 to stop gating clock pulses to A to D converters 114 and 116. In addition, a logic "0" on line 96 will cause DMA request circuit 134 to stop generating a request signal on line 140, and will cause the DMA completed circuit 138 to generate a signal on line 142 which indicates to the computer's DMA controller that no further data is available to be read into the computer's memory.

Summarizing the operation of the processing circuitry set forth in FIGS. 2 and 3, when a light beam is incident on detector 24, analog signals representative of the X and Y axis coordinates of the beam's position on the detector are generated by the analog dividers 56 and 74. These signals are in turn digitized by A to D converters 114 and 116, and are stored in computer memory by utilizing conventional direct memory access techniques.

In the absence of a light beam incident on detector 24, the logic output of threshold detector 82 prevents the various elements of the processing circuitry from operating, and provides an indication to the computer that no data is available on the outputs of the A to D converters. In addition, during that time when no light beam is incident on the detector 24, the feedback loops formed by the baseline averager circuits 50, 68, and 86, and the differential amplifiers 42, 60, and 78, serve to track and to eliminate signals generated by unwanted noise or background radiation so that when a light beam is incident on detector 24, the position calculations performed by analog dividers 56 and 74 will not be affected by these unwanted signal components.

From the positional data stored in the computer's memory, the vorticity components $\omega_x$ and $\omega_z$ may be readily determined. Since the sampling rate of the data at the outputs of A to D converters 118 and 120 is known, the X and Y positions of the light beam as a function of time, and thereby the speed and direction of the beam, may be calculated from the positional data. Once the velocity of the light beam is known, it is a relatively simple process to calculate the $\omega_x$ and $\omega_z$ components of vorticity since the velocity of the light beam is dependent on the angular velocity $\overline{\Omega}$ of the spheres 14, and the vorticity $\omega$ of the fluid is related to the angular velocity of the spheres by the equation $\overline{\omega} = 2\overline{\Omega}$. The actual algorithm utilized by the computer to perform these calculations does not form a part of the present invention.

The individual values of vorticity obtained from the system described above do possess some uncertainties. These uncertainties vary in an essentially random pattern over a set of values, and the significance of the errors depends on the number of samples stored in memory for a given scan of the detector, as well as the intensity of the particle's reflection relative to the fluctuating background light. The uncertainties depend only very weakly on the actual vorticity value. Reflected intensity varies with the fourth power of the individual mirror diameter, and is modulated by shadows of other particles in the path of the reflected beam. Although these effects do not introduce detectable systematic error in typical vorticity distributions, they can limit the usable data rate. Multiple simultaneous reflections on the detector are unusable since the detector gives only the centroid of total illumination. The events usually have characteristic signatures (such as very strong curvature and/or obvious slope discontinuities) which can be readily recognized by the data reduction program and rejected. Since a few spurious events that are not rejected can be tolerated, the operating conditions can be set close the the optimum event rate limited by the data rate drop due to multiple reflection events. Typical optimum data rates are about 300 events per second.

Figure 4:
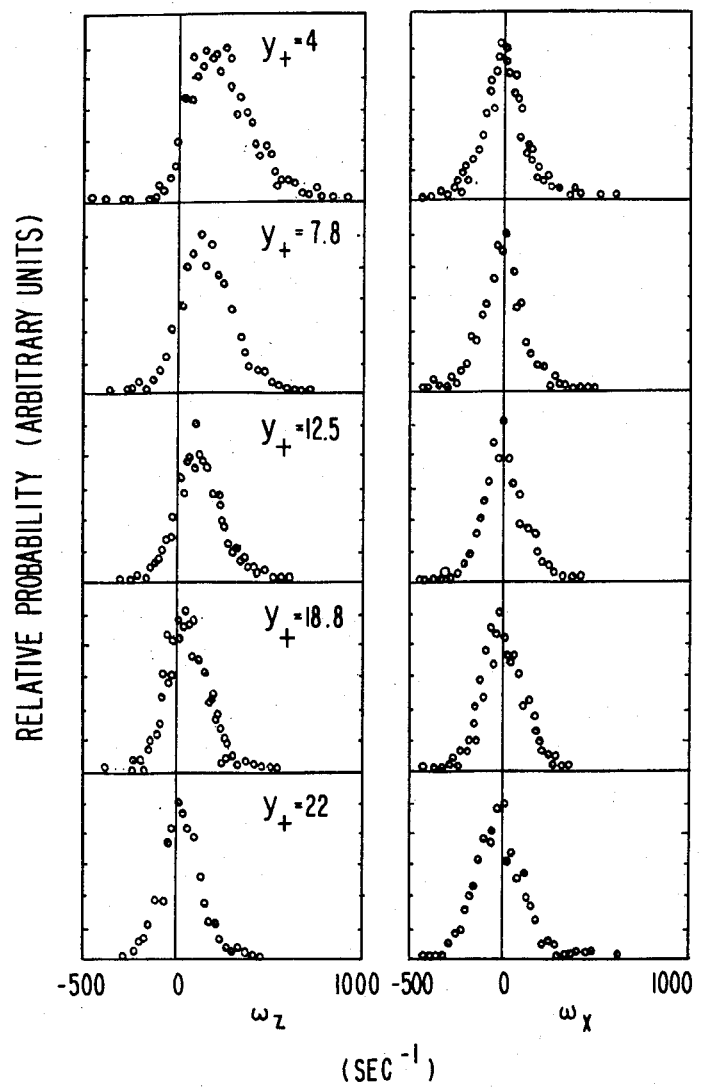
FIGS. 4a and 4b are illustrations of the vorticity distributions for two vorticity components obtained from the system of the invention.

Experimental tests of the vorticity optical probe measurement system set forth in FIGS. 1 through 3 on an inadequately characterized transitional boundary layer in a small duct flow were conducted to illustrate the system's capabilities. Simultaneous measurements of $\omega_x$ (streamwise) and $\omega_z$ (spanwise) vorticity components in a transitional duct flow were recorded as a function of y, the distance from the channel or duct wall into the flow. Some of the vorticity distributions obtained from these measurements are illustrated in FIGS. 4a and 4b. All measurements were made 32 cm downstream from a trip (origin of turbulent boundary layer in flow) with a free stream velocity of 40 cm/s, and a Reynolds number based on a displacement thickness of 900.

FIG. 4a shows the relative probability distribution of the $\omega_z$ (spanwise) component measured with a resolution of four y+ units, where y+ is the dimensionless turbulent coordinate given in terms of wall vorticity by $$y+ = \left(\frac{\partial u}{\partial y}\bigg|_{y=0}\right)/\nu = \sqrt{\omega_0/\nu}\; y$$

wherein $\nu$ is the kinematic viscosity, and $\omega_0$ is the measured wall vorticity. The measured mean wall spanwise vorticity in this flow is about 210 sec.$^{-1}$.

The top diagram of FIG. 4a corresponds to $0 < y+ < 4$. This diagram clearly shows that the vorticity fluctuation distribution extends to negative spanwise vorticity even within the viscous sublayer near the duct wall.

FIG. 4b shows the relative probability distribution of the $\omega_x$ (streamwise) component, again measured with a resolution of four y+ units, and each of the diagrams of FIG. 4b corresponds to the adjacent diagram of FIG. 4a.

It should be noted that without the present invention, the simultaneous measurements which resulted in the probability distributions of FIGS. 4a and 4b would not have been possible, nor would it have been possible to obtain a probability distribution for small or negative vorticity components as was obtained in these experiments.

Figure 5:
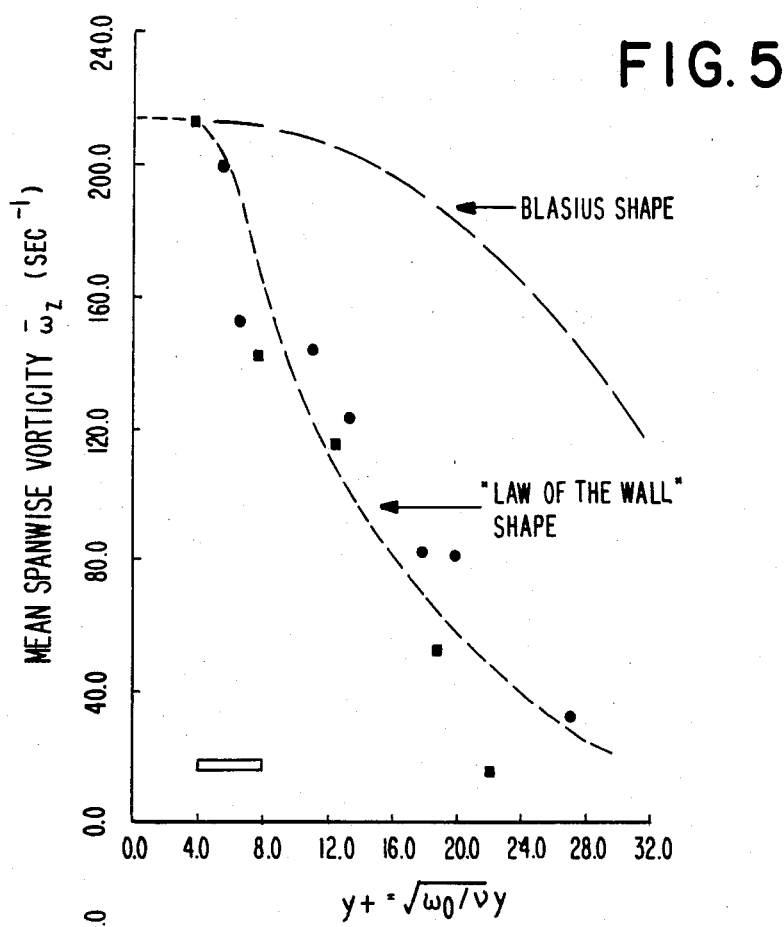
FIG. 5 is a diagram of the mean vorticity profile for the dominant $\omega_z$ vorticity component.
Figure 6:
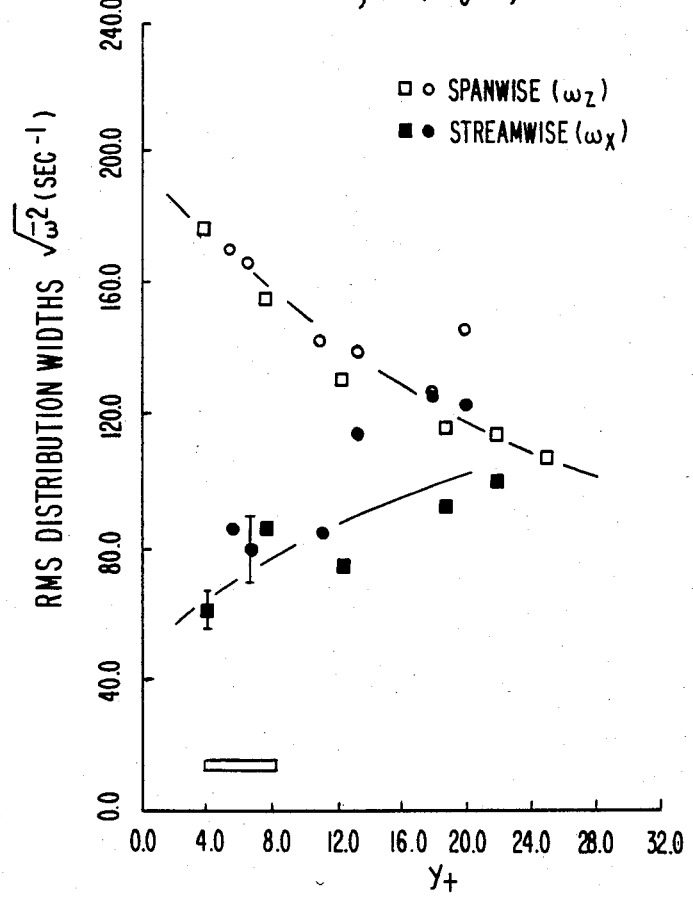
FIG. 6 is a diagram of the RMS distribution widths as a function of y+.

The graph illustrated in FIG. 5 represents the mean spanwise vorticity $\overline{\omega_z}$ as a function of y+, while the graph illustrated in FIG. 6 represents the RMS distribution widths as a function of y+. In both graphs, the circles and squares represent two different sets of measurements being based on about 1500 vorticity values. In addition, in FIG. 6, the solid symbols represent $\omega_x$ or streamwise vorticity values, while the open sysmbols represent the $\omega_z$ or spanwise vorticity values. "Law of the wall" and Blasius shapes have been included in FIG. 5 and are scaled to the measured wall vorticity as a means of comparing profiles.

From FIGS. 5 and 6 it can be seen that with increasing y, the mean values of $\omega_z$ distributions decrease, while their RMS distribution widths decrease by a factor of three and become more nearly symmetrical. The RMS widths of the $\omega_x$ distribution increase somewhat with increasing y. It is interesting that the vorticity profile of FIG. 5 seems to exhibit a "Law of the wall" shape, although the wall vorticity at this position is only slightly greater than would be expected for a laminar boundary layer. The wall vorticity in fully turbulent flow would be three times this value. As may be seen in FIG. 6, the RMS width of the $\omega_x$ (streamwise) distributions increases as the $\omega_z$ (spanwise) widths decrease until at y+ $\approx$ 30 to 40 they are comparable, suggesting isotropic vorticity for y+ > 40.

Figure 7:
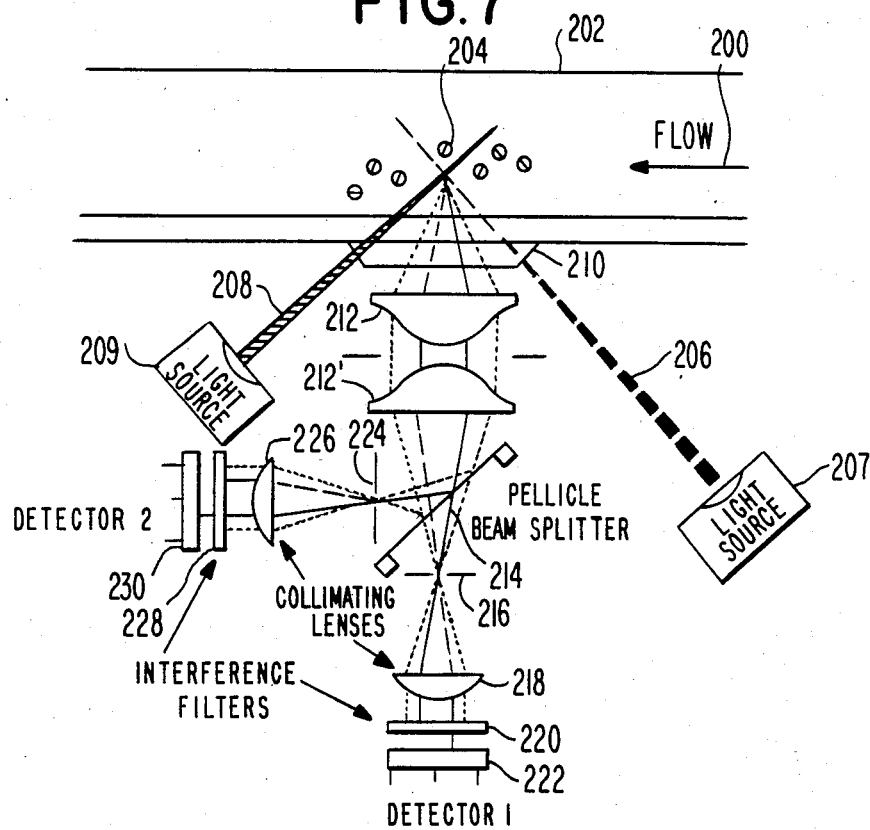
FIG. 7 is a diagrammatic illustration of a second embodiment of the invention which utilizes two incident light beams, and two photodetectors.

Turning now to FIG. 7, there is shown a second embodiment of the present invention which makes use of two dual axis photodetectors. Specifically, there is shown in FIG. 7 a flow stream 200 which is confined in a channel 202, and contains a plurality of reflective spherical particles 204. A first beam of light 206 is adapted to be reflected off of particles 204, while a second beam of light 208 is also adapted to be reflected off of particles 204 at the same location, but with a different angle of incidence. A prism 210 is utilized to focus both beams of light at the common location in the flow 200. Light beams 206 and 208 both radiate from light sources 207 and 209, such as argon ion lasers. The light in the sources is of different wavelengths, however, with the light in beam 206 having a wavelength of 488 nm, for example, and the light in beam 208 having a wavelength of 514.5 nm, for example.

The light which is reflected off of particles 204 by both beams 206 and 208 is directed through a pair of small f-number aspheric collectors 212 and 212' to a pellicle beam splitter 214, which splits the reflected beams into two separate paths. One path includes a pinhole 216, a collimating lens 218, and an interference filter 220, and terminates at a first dual axis position-sensing photodetector 222. Similarly, the second path from beam splitter 214 includes a pinhole 224, a collimating lens 226, and an interference filter 228, and terminates at a second dual axis position-sensing photodetector 230. Interference filters 220 and 228 are selected to pass only certain wavelengths of light so that detector 222 will only receive light having the same wavelength as that of beam 206, for example, and detector 230 will only receive light having the same wavelength as that of beam 208, for example. In this manner, the two detectors 222 and 230 serve as independent vorticity probes of the same sample volume.

Figure 8:
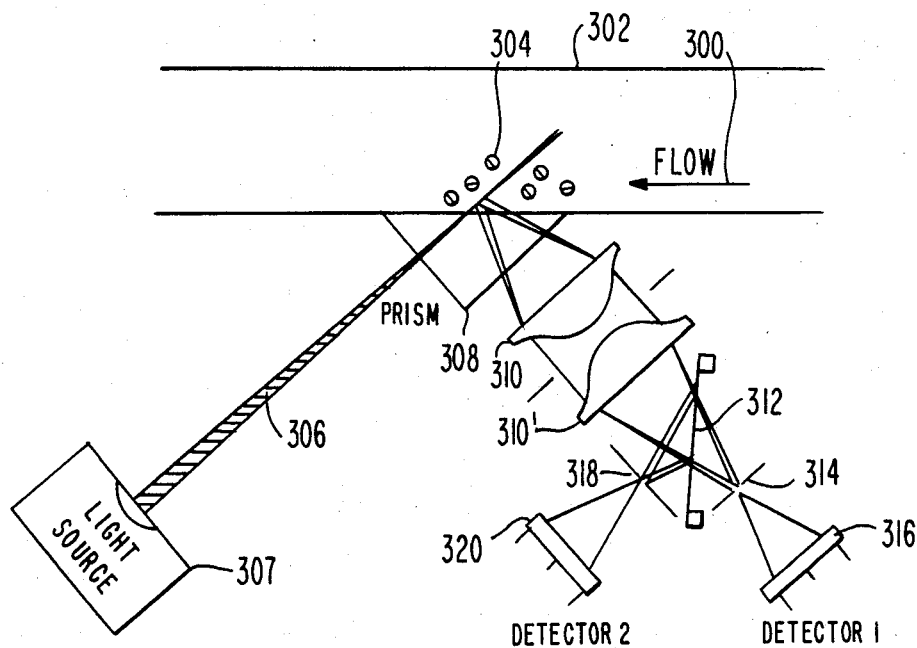
FIG. 8 is a diagrammatic illustration of a third embodiment of the invention which utilizes two photodetectors; and, FIG. 9 is a block diagram of the processing circuitry utilized for converting the analog outputs of plural detectors to digital form, and interfacing the same to the memory of a digital computer.

FIG. 8 shows yet another embodiment of the present invention which makes use of two photodetectors. A flow stream 300, which is constrained in a flow channel 302, contains a plurality of reflective spherical particles 304. An incident beam of light 306 from a light source 307, such as a laser is focused onto the flow 300 through a prism 308. The light which is reflected off of particles 304 at two different locations is directed through a pair of small f-number aspheric collectors 310 and 310' to a pellicle beam splitter 312, which serves to split the reflected beam into two separate paths, the light reflected from one location passing through a pinhole 314 and impinging on a first dual axis position-sensing photodetector 316, while the light reflected from the other location passes through a pinhole 318, and impinges on a second dual axis position-sensing photodetector 320. The pinholes 314 and 318 are arranged so that detector 318 receives reflections from one location in flow 300 when a reflection is present at that location, and detector 320 receives reflections from a different location in flow 300 when a reflection is present in that location.

Figure 9:
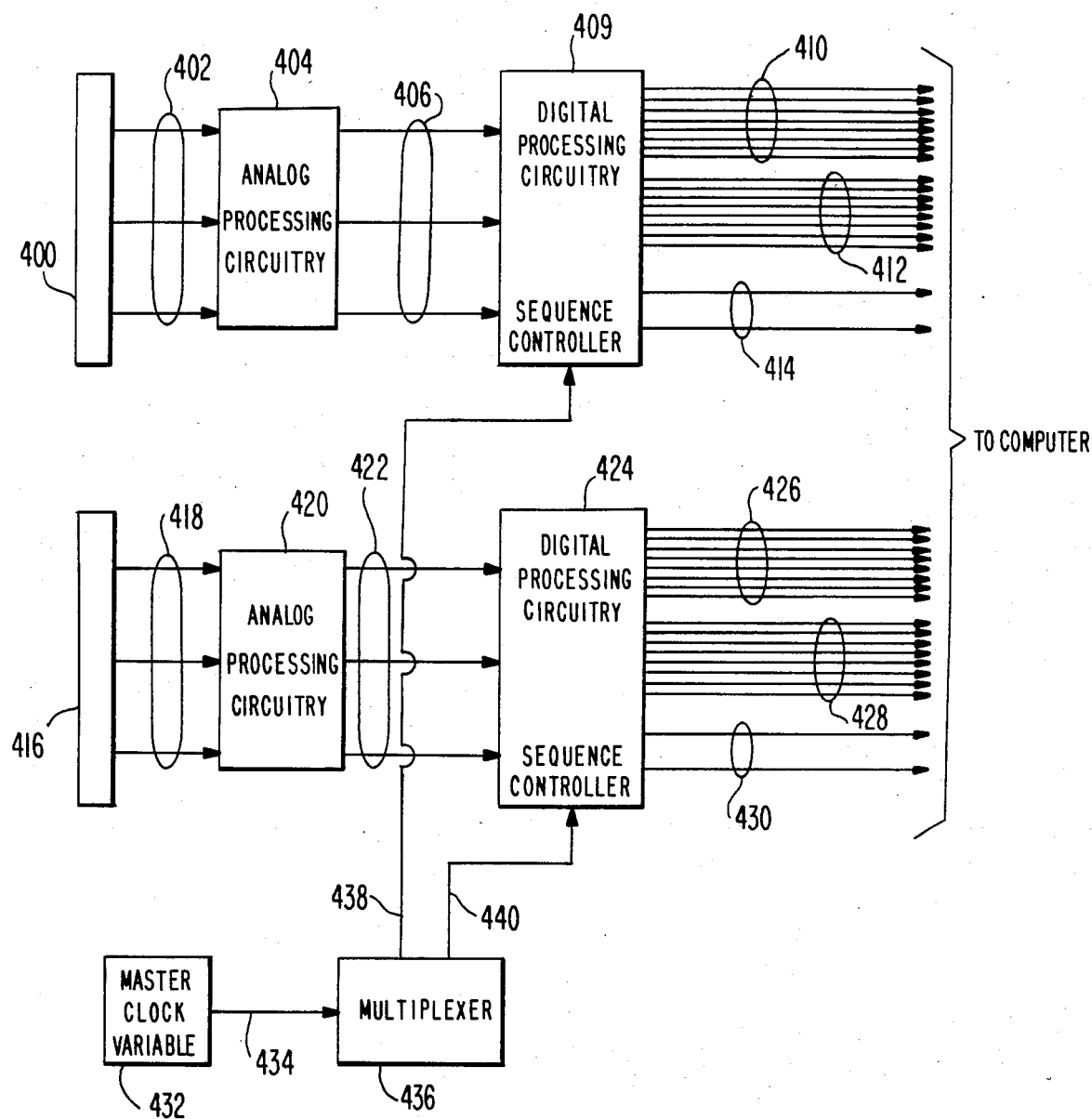

Turning now to FIG. 9, there is shown a block diagram of the digital processing circuitry necessary to interface the beam position data from a plurality of photodetectors to a digital computer. This circuitry may accordingly be utilized in conjunction with the embodiments of the invention set forth in FIGS. 7 and 8. As shown a first photodetector 400 has its three outputs connected through lines 402 to analog processing circuitry 404. This processing circuitry includes all of the circuitry of FIG. 2, previously described. The three outputs of circuitry 404 are in turn fed through lines 406 to digital processing circuitry 408, which is similar to the circuitry set forth in FIG. 3. Eight lines 410, and eight lines 412 connect the outputs of the A to D converters (see FIG. 3) in the digital processing circuitry 408 to the memory of a digital computer (not shown), and a pair of lines 414 feed the DMA request and DMA completed signals to the DMA controller of the digital computer.

A second photodetector 416 is also shown in FIG. 9, and is connected to circuitry which is substantially identical to the circuitry connected to detector 400. Specifically, three lines 418 feed the outputs of detector 416 to the inputs of analog processing circuitry 420, while three lines 422 feed the outputs of the circuitry to the inputs of digital processing circuitry 424. Eight lines 426, and eight lines 428 connect the outputs of the A to D converters in the digital processing circuitry 424 to the memory of the digital computer, and a pair of lines 430 feed the DMA request and DMA completed signals to the DMA controller.

A variable master clock 432 is connected through a line 434 to a multiplexer 436, and provides clock pulses thereto. The multiplexer has two outputs, one of which is connected through a line 438 to the sequence controller of digital processing circuitry 408, and the other of which is connected through a line 440 to the sequence controller of digital processing circuitry 424. The multiplexer serves to insure that the computer receives data from only one of the processing circuits at a time, and enables the storage of the different sets of position data in different locations in computer memory.

Through the utilization of the two detector systems set forth in FIG. 7 wherein two separate light beams are reflected off of a common location in the flow stream, the data rate may be doubled, and the data in the two channels can even be coincident, thereby eliminating dead times between events and excess noise at the high frequency limit. In addition, all three components of vorticity ($\omega_x$, $\omega_y$ and $\omega_z$) can be measured by the system of FIG. 7 with suitable orientation of incident beams and collection optics.

The plural detector system set forth in FIG. 8 is utilized for obtaining vorticity measurements at two different locations in the flow stream. This system is useful for calculating spatial vorticity correlations for two components.

Although the invention has been described in terms of preferred embodiments, it will be apparent to those of skill in the art that numerous variations and modifications can be made. Accordingly, it is desired that the true spirit and scope of the invention be limited only as set forth in the following claims.

We claim:

1. An optical system for the direct measurement of vorticity in a fluid, comprising:
   an optically clear liquid flow;
   a plurality of transparent, spherical probe particles carrying planar mirrors, said probe particles having a size sufffciently small to permit rotation with the vorticity of the said liquid, said particles being suspended in said liquid;
   a first source of light;
   first means for directing a first incident beam of said light into said liquid, said incident beam of light striking and being reflected by said planar mirrors carried by said probe particles;
   at least a first position sensing dual axis photodetector position to receive light beams being reflected by said planar mirrors carried by said probe particles, said position sensing photodetector providing three analog outputs; a first output which is proportional to the intensity of a light beam incident on the photodetector; a second output which is proportional to the product of the incident light beam intensity and the position of the incident light beam with respect to an X axis of the photodetector; and, a third output which is proportional to the product of the incident light beam intensity and the position of the incident light beam with respect to a Y axis of the photodetector; and
   first circuit means connected to said photodetector outputs for generating measurements which are proportional to the position of a reflected beam with respect to the X and Y axes of said photodetector as a function of time, whereby the beam position information is indicative of the scanning velocity of the reflected beam across the photodetector, which is proportional to two components of the annular velocity of said probe particles, and is thereby proportional to two components of the vorticity of said liquid.

2. The vorticity measurement system of claim 1, wherein said position sensing photodetector is positioned to receive light beams reflected by said probe particles disposed in a first location of said flow path, and further comprising:
   a second position sensing dual axis photodetector positioned to receive light beams being reflected by said planar mirrors carried by said probe particles disposed in a second separate location of said flow path, said second position sensing photodetector also providing three analog outputs; a first output which is proportional to the intensity of a light beam incident on the photodetector; a second output which is proportional to the product of the incident light beam intensity and the position of the incident light beam with respect to an X axis of the photodetector; and, a third output which is proportional to the product of the incident light beam intensity and the position of the incident light beam with respect to a Y axis of the photodetector; and second circuit means connected to the outputs of said second position sensing photodetector for generating measurements which are proportional to the positon of a reflected beam with respect to the X and Y axes of said second photodetector as a function of time, whereby measurements of vorticity in said first and said second locations in the flow path may be simultaneously obtained.

3. An optical system for the direct measurement of vorticity in a fluid, comprising:

an optically clear liquid flow;

a plurality of transparent, spherical probe particles carrying planar mirrors, said probe particles having a size sufficiently small to permit rotation with the vorticity of said liquid, said particles being suspended in said liquid;

a first source of light which generates light of a first single wavelength, and is positioned at a first location;

first means for directing a first incident beam of said light into a distinct location in said liquid, said incident beam of light striking and being reflected by said planar mirrors carried by said probe particles;

a second source of light positioned in a second different location which generates light of a second single wavelength that is different from said first single wavelength;

second means for directing a second incident beam of light from said second source into said liquid at said same distinct location as that of said first incident beam;

a first dual axis photodetector positoned to receive light beams being reflected by said planar mirrors carried by said probe particles;

first circuit means connected to said first photodetector for generating measurements which are proportional to the position of a reflected beam with respect to the X and Y axes of said first photodetector as a function of time, whereby the beam position information is indicative of the scanning velocity of the reflected beam across the first photodetector, which is proportional to two components of the angular velocity of said probe particles, and is thereby proportional to two components of the vorticity of said liquid;

means for receiving the light beam reflected off of said planar mirrors of said spherical particles disposed at said location in said liquid and dividing the reflected beam path into a first and a second beam path;

means for directing beams along said first beam path through a first filter means and onto said first dual axis photodetector, said first filter means being adapted to pass light of said first single wavelength, but not light of said second single wavelength, whereby said first dual axis potodetector receives only light being reflected off of said probe particles of said first single wavelength;

means for directing beams along said second beam path through a second filter means, said second filter means being adapted to pass light of said second signle wavelength, but not light of said first single wavelength;

a second dual axis photodetector positioned to receive light from said second beam passing through said second filter means, whereby said second dual axis photodetector receives only light beams being reflected off of said probe particles of said second single wavelength; and second circuit means connected to said second photodetector for generating measurements which are propotional to the position of a reflected beam with respect to the X and Y axes of said second photodetector as a function of time, whereby two simultaneous measurements of two components of vorticity at the same location in the liquid may be obtained.

4. The vorticity measurement system of claim 2, further comprising;

conversion circuitry responsive to the measurement generated by said first and second circuit means for converting said measurements into a plurality of discrete digital values suitable for processing by a digital computer; and controller circuitry including a clock pulse generator for controlling the rate at which said conversion circuitry converts said measurements generated by said first and second circuit means into said plurality of digital values, and multiplexer means for preventing said conversion circuitry from converting measurements from said first and second circuit means simultaneously.

5. The vorticity measurement system of claim 4, further comprising:

interface circuitry for transferring said plurality of discrete digital values into the memory of a digital computer, whereby the computer may perform calculations on said digital values and obtain measurements of the vorticity of the liquid flowing in said channel.

6. The vorticity measurement system of claim 3, further comprising:

conversion circuitry responsive to the measurement generated by said first and second circuit means for converting said measurements into a plurality of discrete digital values suitable for processing by a digital computer; and controller cicuitry including a clock pulse generator for controlling the rate at which said conversion circuitry converts said measurements generated by said first and second circuit means into said plurality of digital values, and multiplexer means for preventing said conversion circuitry from converting measurements from said first and second circuit means simultaneously.

7. The vorticity measurement system of claim 6, further comprising:

interface circuitry for transferring said plurality of discrete digital values into the memory of a digital computer, whereby the computer may perform calculations on said digital values and obtain measurements of the vorticity of the liquid flowing in said channel.

8. The vorticity measurement system of claim 1, further comprising:

collector optics positioned between said channel means and said position sensing photodetector so that the light reflected by said probe particles will be sharply imaged over a large reflection solid angle with minimum spherical aberration.

9. The vorticity measurement system of claim 3, wherein said means for receiving and dividing the reflected beams includes:

collector optics for sharply imaging the reflected beams over a large reflection solid angle with minimal spherical aberration; and a beam splitter for dividing the reflected beam path into said first and second beam paths.

10. The vorticity measurement system of claim 7, wherein said first filter means comprising an interference filter tuned to said first wavelength, and said second filter means comprises an interference filter tuned to said second wavelength.

11. The vorticity measurement system of claim 1, wherein said circuit means includes:

means for generating a plurality of discrete digital values which are proportional to the position of a reflected beam with respect to the X and Y axes of said position sensing photodetector at the time each discrete value is generated.

12. The vorticity measurement system of claim 11, wherein said circuit means further includes:

means for reading said discrete digital values into the memory of a digital computer so that the computer may calculate two components of vorticity from said digital values.

13. An optical system for the direct measurement of vorticity in a fluid, comprising:

an optically clear liquid flow;

a plurality of transparent, spherical probe particles carrying planar mirrors, said probe particles having a size sufficiently small to permit rotation with the vorticity of the said liquid, said particles being suspended in said liquid;

a first source of light;

first means for directing a first incident beam of said light into said liquid, said incident beam of light striking and being reflected by said planar mirrors carried by said probe particles;

at least one position sensing dual axis photodetector positioned to receive light beams being reflected by said probe particles, said photodetector providing three analog outputs; a first output which is proportional to the intensity of the light being received by the photodetector, a second output which is proportional to the product of said intensity and the position of a light beam on the photodetector with respect to the X axis, and a third output which is proportional to the product of said intensity and the position of a light beam on the photodetector with respect to the Y axis;

noise elimination circuitry responsive to unwanted signals in said three outputs of said photodetector, which compensates for said unwanted signals and provides three noise reduced information signals corresponding to the signals on each of said three outputs of said photodetector;

analog divider circuitry responsive to said three noise reduced information signals for dividing two of said noise reduced information signals by the remaining noise reduced information signal, and providing a first analog beam position signal which is proportional to the position of a light beam on said photodetector with respect to the X axis, and a second analog beam position signal which is proportional to the position of a light beam on said photodetector with respect to its Y axis;

conversion circuitry responsive to said two beam position signals for converting said signals to a plurality of discrete digital values suitable for processing by a digital computer; and controller circuitry including a clock pulse generator for controlling the rate at which said conversion circuitry converts said beam position signals into said digital values.

14. The vorticity measurement system of claim 13, wherein the rate of said clock pulse generator is variable so that the rate at which said conversion circuitry converts said beam position signals into said digital values may be varied.

15. The vorticity measurement system of claim 13, further comprising:

interface circuitry for transferring said plurality of discrete digital values into the memory of a digital computer, whereby the computer may perform calculations on said digital values and obtain simultaneous measurements of two components of the vorticity of the liquid flowing in said flow channel.

* * * * *